United States Patent
Forni

[11] 3,829,135
[45] Aug. 13, 1974

[54] BELL FITTING FOR REINFORCED PLASTIC-MORTAR PIPE AND THE LIKE

[76] Inventor: Jay S. Forni, 1101 Leema Dr., Danville, Calif. 94526

[22] Filed: July 3, 1973

[21] Appl. No.: 376,121

[52] U.S. Cl.............. 285/55, 285/230, 285/288, 72/82
[51] Int. Cl........................ F16l 9/08, B22d 21/14
[58] Field of Search............ 285/55, 230, 231, 286, 285/288, 345; 72/80, 81, 82, 83, 84, 85

[56] References Cited
UNITED STATES PATENTS

| | | | |
|---|---|---|---|
| 2,416,618 | 2/1947 | Ferla | 285/288 X |
| 3,228,712 | 1/1966 | Hausmann et al. | 285/288 X |
| 3,738,689 | 6/1973 | Forni | 285/55 |

Primary Examiner—Richard J. Scanlan, Jr.
Attorney, Agent, or Firm—Owen, Wickersham & Erickson

[57] ABSTRACT

Bell-type fittings for reinforced plastic-mortar pipe are made utilizing cement-lined iron pipe sections, by welding to each end of each section a spin-formed bell with a flared outer end and an inturned portion welded to the iron pipe. The spin-forming provides the increased tensile strength needed to hold the main portion of the bell in round. After the bell is welded to the iron pipe section, it is exteriorly coated with reinforced cement. Then a standard end for reinforced plastic-mortar pipe—a spigot having an exterior annular groove with a gasket—can be inserted into the bell, thus completing a fluid-tight seal.

10 Claims, 7 Drawing Figures

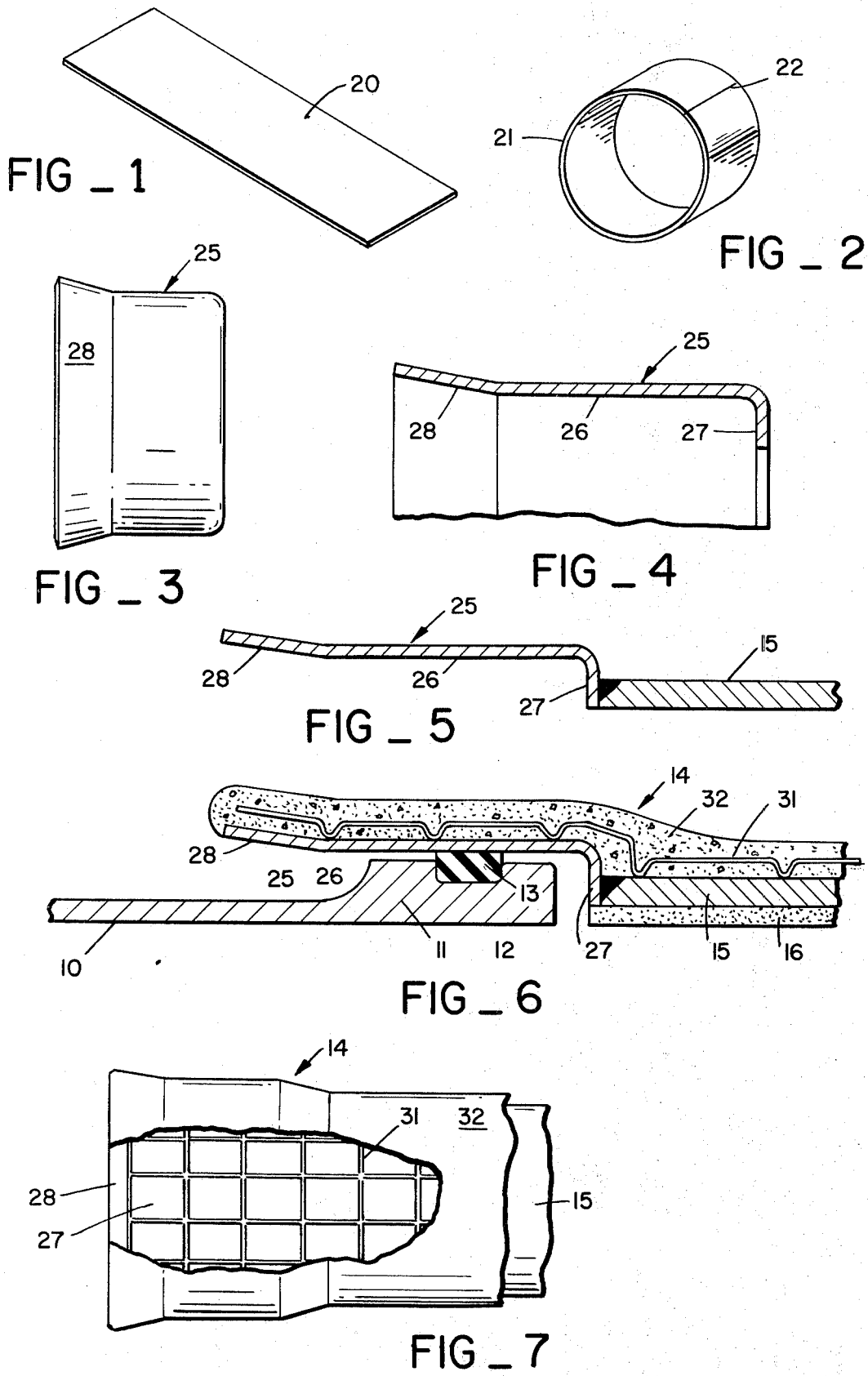

BELL FITTING FOR REINFORCED PLASTIC-MORTAR PIPE AND THE LIKE

BACKGROUND OF THE INVENTION

This invention relates to an improved bell-type fitting for reinforced plastic-mortar pipe.

Reinforced plastic-mortar pipe is in ever wider use and especially for large diameter pipe, for example, from eight inches to fifty-four inches; it is now marketed throughout the world. This pipe may be a composite structure of fiberglass, polyester resin, and sand, for example. Each pipe section normally has at least one spigot with a gasket. When used in city piping or in irrigation schemes or even with other fluids, it is necessary to join the long sections of this pipe together by bell-type fittings, and there is a wide variety of such fittings, so that they generally have to be made up for each job; it is rarely feasible to carry in stock enough fittings of the wide variety of pipes and sizes needed. Thus, there are elbows, straight coupling sections, tees, angled sections, reducing sections, and so on.

Many of these fittings have been made heretofore by utilizing cement-lined iron pipe and cutting it off in sections, sometimes welding sections together as for making elbows and angles, sometimes cutting openings through the side wall and in all instances having some means for coupling at the end, or at least at one end. Such fittings have heretofore been provided with a bell by using short cast iron pipe sections or rolled heavy wall steel sections, both of which have been machined to provide the needed dimensions and shapes and have then been welded to an adapter ring which, in turn, is later welded to a longer piece of iron or steel pipe section. The importance of the accuracy of the tolerances needed is a point well worth considering. The pipe has a spigot at each end, comprising an annular groove with an inserted O-ring which is to provide the seal, for if the pipe leaks at its couplings, it is, of course, completely unsatisfactory. These spigots are identical for any one particular size, so that as carried in stock they are quite uniform. However, the problem has been that since they are thus made and are made quite accurately, the bells that cooperate with them must likewise be made quite accurately. They must be round and not distorted into an oval or elliptical or irregular shape, and the tolerance is typically kept within twenty or thirty thousandths of an inch. Moreover, as the pipe size increases, it becomes increasingly difficult to achieve the required tolerances.

Since the individual coupling sleeves have had to be made individually, the required tolerances have heretofore been achievable only by machining and even when achieved, have been very difficult to maintain. When the machined metal bells are welded on to the cement-lined iron pipe, the heat of welding distorts them, and although the distortion may be slight from a visual standpoint, it has often been too much to be tolerated for it has often resulted in leakage at the couplings. Thus, although machining is expensive and is quite accurate, the accuracy is often nullified by the necessity of the later welding to the iron pipe. After these bells are installed, and in many cases are coated with cement or with other materials, there is still a further difficulty in keeping them round, due to the cooling, internal stresses, and other factors. Manufacturers have often welded steel bars, sometimes two or three, across the mouth of such a machined bell in order to maintain it in round during the welding and mounting to the iron pipe. However, these bars have to be cut off before use and whether cut off in the field or elsewhere, the very heat needed to cut them off with a welding torch, plus the other reasons mentioned above, results in the distortion again, and the bell then goes out of round, the spigot fails to fit properly in the fitting bell, and a leak results—after the pipe has been put underground and when the replacement or repair cost is larger.

What has been needed is a less expensive and more accurate way of making the bell fittings so that they can be made in any desired shape, maintain the desired tolerance, and stay in round.

SUMMARY OF THE INVENTION

The bell fittings of the present invention utilize sheet metal, such as three, eight or ten-gauge sheet steel, which can readily be cut into strips, rolled into a circle with its ends welded together to make a completely accurate initial cylindrical sleeve the same diameter as the iron pipe and in fact larger than the needed bell. Then the sleeve itself is formed to a desired shape by means of spinning, which greatly increases the tensile strength and enables it to maintain its round shape much better than does a cast and machined member. The spinning provides a generally cylindrical main portion leading to an outwardly flaring lead-in portion. The spinning also provides a radially inturned portion which is welded to the iron pipe. This radially inturned portion also adds to the strength of the bell and helps in preventing distortion during welding and mounting to the iron pipe. Due to the thinness of light sheet metal, welding this material does not generate appreciable heat, whereas the heat generated when welding thick iron pipes is a major factor in distortion and in causing internal stresses. Hence, after being made to shape and precise size, the bell can be safely welded to the iron pipe section and be covered with cement, or other suitable coating material, to protect the metal from corrosion.

The result is a less expensive but more accurate and stronger bell-type coupler which does much better in meeting the required tolerances and retaining its true roundness. The coupler is also capable of withstanding substantial fluid pressures.

Other objects and advantages of the invention will appear from the following description of a preferred embodiment.

BRIEF DESCRIPTION OF THE DRAWINGS

In the drawings:

FIG. 1 is a view in perspective of a strip of sheet metal such as steel cut to length for forming the sleeve of FIG. 2.

FIG. 2 is a view in perspective of a tube formed by rolling the strip of FIG. 1 into a perfect circle and then welding its ends together.

FIG. 3 is an enlarged view in side elevation of the tube of FIG. 2 after it has been spun into a final bell shape.

FIG. 4 is a further enlarged fragmentary view in section of the bell of FIG. 3.

FIG. 5 is another fragmentary view of a portion of the bell welded to an iron or steel pipe, most of which is broken away.

FIG. 6 is a view similar to FIG. 5 of a completed fitting with the cement lining and coating in place and with a spigot installed therein.

FIG. 7 is a fragmentary view in side elevation of the pipe fitting with exterior reinforcing thereon, a portion of the cement being broken away to show the reinforcing.

DESCRIPTION OF THE PREFERRED EMBODIMENT

The fitting of this invention is used with conventional reinforced plastic-mortar pipe 10 having a spigot end 11 (see FIG. 6) with a groove 12 holding a gasket 13. A fitting 14 of this invention employs an iron pipe 15 which is or will be interiorly lined with cement 16. Depending on the nature of the fitting, these iron pipe sections 15 are cut to a desired shape, and a desired size is used. The end portions to which the fittings are applied are cut accurately, and the work of this invention begins with the work of making the pieces that go on the end to transform these pipe sections into fittings.

To start with, sheet steel, such as three, eight, or ten-gauge material, is cut into strips 20 (FIG. 1) of a desired length and width, the length being such that the device when rolled can be made into a cylinder 21 (FIG. 2) having a certain exact circumference and diameter, the width being determined by the requirement of the reinforced plastic-mortar joint. The diameter at this time is larger than will be the final diameter of the gasket-engaging portion. After the strip 20 has rolled into a perfect circle, its ends are welded together at 22.

The next step is a very important feature of the invention: this generally cylindrical tube 21 is spin-formed into a final shape, shown in FIGS. 3 and 4. Spin-forming reduces the diameter of most portions of the steel cylinder 21, makes it more compact, and as a result, substantially increases its tensile strength, so that the tensile strength of the finished bell 25 may be two or three times as great as that of the initial tube 21 or of the sheet metal strip 20 used to make it. Moreover, the spin-forming is preferably done on a mandrel which has previously been machined very accurately, so that in order for the spin-formed sleeve 25 to come off the mandrel, it must be round. As a result, initial roundness of the finished article is assured.

As shown in FIGS. 3 and 4, the general shape of all such bells 25, as finished, is substantially the same, though their dimensions may vary. In each instance, there is a main cylindrical gasket-engaging bell portion 26. A radially inturned portion 27 is formed at one end to abut and be welded to the iron pipe 15. At the other end, the bell 25 has a flaring portion 28 for entry of the spigot. At its widest, the flared portion 28 is at about the same diameter as the original tube 21. Typically, the spin-forming results in the outer diameter of the bell 25 being reduced thereat by about 10 to 20 percent, depending upon the article being made, for there will be a difference between bells for 54-inch pipe and those for 8-inch pipe. The angle of flare is preferably about 12° to 15°, though it can be somewhat greater if desired, but it should be kept fairly close to that figure to provide a range within the desired tolerance and thus meet the tolerances of the manufacturer of the reinforced plastic-mortar pipe.

The main cylindrical portion 26 is the portion on which the gasket 13 is to slide, and it is very important for the dimensions of the portion 26 to lie within the proper tolerance, which is preferably kept within ±0.020 inch. It is also very important for the portion 26 to be kept relatively smooth; otherwise, a sharp projection can cut or tear the sealing gasket and thereby cause a leak. The flared portion 28 is generally frustoconical and about one-inch long, and the tolerances here are less critical. This portion 26 provides an entry or guiding or lead-in portion for helping to center the spigot 11 and the gasket 13.

When the bell 25 has been formed to exact shape and is removed from the mandrel, it is quite round, quite strong, and well able to maintain its roundness. Preferably, it is then coated, exteriorly at least, with suitable material to protect the steel against rust, such as red lead, or an epoxy resin.

Whether coated or not, the next step is to weld this bell 25 on to a pipe section 15. The pipe section 15 has been previously cut to shape, and this usually results in an irregular edge of the cement or plastic lining 16, but, of course, a very regular edge of the iron pipe 15 itself. The bell 25 is welded to it and, due to the spinning, maintains its roundness during and after the welding. The pipe section 15 may have a bell 25 at other locations. The next step is usually to finish the lining and coating of the fitting assembly. It is important for the inner diameter of the lining 16 to match the inner diameter of the pipe 10, so that little or no turbulence is created by the coupling connection.

It is advisable to cover the iron pipe section 15. Reinforcing wire 31 is placed around the pipe 15, and cement or other suitable coating 32 is applied over that to cover it so that there is no exposed metal left. Then the finished fitting is cured, as by being sealed with a plastic sheet that covers it and prevents the exit of moisture, so that the coating 32 can cure without having to have additional water added. Epoxy resins, asphalt, and coal tar wrappings may be used instead of cement for the exterior coating.

In the field, the user than places a reinforced plastic-mortar pipe 10 into the bell 25. The spigot 11 is inserted, and the inturned portion 27 prevents overconnection. Once the gasket 13 is forced into place, the fitting will not leak, and tests have shown that it will maintain this accuracy so that the supplier can guarantee it. Hydrostatic tests have shown that a joint of the present invention can withstand more pressure than the reinforced plastic-martar pipe itself, an admirable feature.

The finished result, then, is a fitting 33 having at each end a coupling bell 20 of this invention. Yet, the internal diameter of the fitting matches that of the pipe, so that little or not turbulence is created when liquid flows through the pipe and fitting.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A bell-type fitting for reinforced plastic-mortar pipe, for use with the spigot end of said pipe having an O-ring gasket therearound seated in an exterior groove thereof for peripheral sealing engagement with the inner surface of the bell-tight fitting and with the pipe, respectively, comprising:

an interiorly-lined iron pipe section having welded to each end in end-to-end abutment, a generally cylindrical sleeve of sheet metal of a wall thickness substantially less than the wall thickness of said iron pipe and having one end radially inturned and extending in to the same inner diameter as said iron pipe and a directly succeeding gasket-engaging cylindrical spin-formed portion of diameter equal to the largest diameter of said radially inturned portion, said sleeve having a terminal flaring portion, said sleeve having greatly increased tensile strength relative to a sleeve formed by rolling and having resistance to change from true roundness by the heat of welding, said cylindrical portion sealing accurately upon engagement with a said gasket ring without the necessity of water pressure and sealing both in the presence and absence of such water pressure.

2. The fitting of claim 1 wherein said sleeve is coated with a coating continuous with a coating of said iron pipe and wherein the inner diameter of said fitting is the same as that of said pipe to which it is to be coupled.

3. A fitting for reinforced plastic-mortar pipes comprising an attachment butt-welded to the ends of an interiorly lined iron or steel pipe section for cooperation with a spigot at one end of a length of reinforced plastic-mortar pipe having an exterior groove with a gasket ring therein, said attachment comprising:

a generally cylindrical spin-formed sleeve of sheet metal thinner than said iron pipe, having one flaring end portion substantially larger than said spigot and a directly succeeding cylindrical spin-formed, smooth-walled gasket-engaging portion of smaller diameter than the outer end of the flaring portion, said sleeve having a terminal radially inturned radial portion, said sleeve having greatly increased tensile strength relative to a rolled sleeve of the same thickness and having marked resistance to change from true roundness by the heat of welding.

4. The fitting of claim 3 coated with material continuous with that of said iron pipe.

5. An assembly comprising:

a reinforced plastic-mortar spigot having an exterior cylindrical groove with a solid elastomeric gasket ring therein, a bell-like fitting sealable with the exterior surface of said gasket ring, said fitting comprising an interiorly lined metal pipe section having welded to each end in end-to-end abutment, a generally cylindrical sleeve of sheet steel of a wall thickness substantially less than the wall thickness of said metal pipe and a cylindrical gasket-engaging portion and, at one end thereof a directly succeeding radially inturned portion strengthening said cylindrical portion and welded to said pipe section and, at the other end thereof, a frustoconical flaring portion for entry of said spigot, said sleeve being spin-formed from a sheet metal cylinder of larger diameter than said sleeve and thereby having greatly increased tensile strength with respect to a sleeve of rolled metal of the same thickness and better resistance to distortion in shape by the heat of welding, said spigot coupler being placed into said fitting with its said gasket ring engaging said cylindrical portion and sealing against said spin-formed portion both in the presence and absence of hydraulic pressure.

6. The assembly of claim 5 wherein said sleeve is coated with material continuous with the coating around said metal pipe and said fitting having an inner diameter the same as that of said pipe.

7. A method for making a bell-type fitting for reinforced plastic-mortar pipe, utilizing straight sections of lined iron pipe, cut to a desired size and with ends cut off at a desired angle, comprising the steps, for each end of said pipe, of:

1. rolling a sheet metal strip into a circle of larger diameter than that of the iron pipe and welding its ends together, to provide a cylindrical sleeve,
2. spin-forming said sleeve to provide a frustoconical inwardly-tapering end portion, a succeeding reduced diameter cylindrical portion having increased tensile strength, and a terminal in-turned radial portion at the other end of said sleeve,
3. welding said in-turned radial portion of sleeve to said iron pipe to provide a terminal bell type of fitting, and
4. placing a spigot end of said reinforced plasticmortar pipe coupler with a gasket retained thereby into the fitting and forcing it into place so that said gasket engages the cylindrical portion.

8. The method of claim 7 including also lining the edge of said inturned radial portion of said sleeve at the same inner periphery as that in said iron pipe, and covering said iron pipe and said sleeve, as made in step (2) with a reinforced coating and curing.

9. A method for making a bell-type fitting for reinforced plastic-mortar pipe, utilizing straight sections of cement-lined iron pipe, cut to a desired size and with ends cut off at a desired angle, comprising the steps of, for each end of said pipe, 1. forming a sheet metal strip into a cylindrical sleeve,
2. spin-forming said sleeve to provide a frustoconical lead-in portion, a succeeding reduced diameter cylindrical portion having increased tensile strength, and a terminal inturned radial portion at one end of said sleeve, and
3. welding said radial portion of said sleeve to said iron pipe, to provide a terminal coupler member.

10. A method for making a bell-type fitting for reinforced plastic-mortar pipe, utilizing straight sections of cement-lined iron pipe, cut to a desired size and with ends cut off perpendicularly, comprising the steps of, for each end of said iron pipe, 1. rolling a sheet metal strip into a circle of larger diameter than that of the iron pipe and welding its ends together, to provide a cylindrical sleeve,
2. spin-forming said sleeve to provide a lead-in frustoconical portion at one end of said sleeve, a succeeding reduced-diameter cylindrical portion having increased tensile strength, and a terminal inturned radial portion at the other end of said sleeve,
3. welding said sleeve to said iron pipe at said radial portion to provide a terminal coupler member.

* * * * *